April 6, 1937.   J. ROBINSON ET AL   2,076,161
WAX CRYSTALLIZATION
Filed July 22, 1935   3 Sheets-Sheet 3

INVENTORS
Jack Robinson
Vanderveer Voorhees
By Donald E. Payne
ATTORNEY

Patented Apr. 6, 1937

2,076,161

UNITED STATES PATENT OFFICE 2,076,161

WAX CRYSTALLIZATION

Jack Robinson, East Alton, Ill., and Vanderveer Voorhees, Hammond, Ind., assignors to Standard Oil Company, Chicago, Ill., a corporation of Indiana Application July 22, 1935, Serial No. 32,566

7 Claims. (Cl. 62—170)

This invention relates to wax crystallization and it pertains more particularly to the continuous crystallization of wax in filterable form from a propane-waxy oil solution.

The most critical step of a propane dewaxing process is that of chilling the propane-waxy oil solution to obtain crystallization of wax in readily filterable form. Heretofore commercial plants have employed batch chillers but such chillers are extremely expensive and cumbersome because they require such a large number of valves and plumbing fixtures. The operation of a batch chiller requires the services of more operators than would otherwise be required and these operators must have considerable skill in order to duplicate the filterability of successive batches. As a matter of fact, it is almost impossible to obtain absolutely uniform filtration characteristics in successive batch cooled mixes. The object of our invention is to do away with this expensive and troublesome batch method of wax crystallization and to provide a simple and efficient method for continuously crystallizing wax which will insure uniform filterability and rapid filter rates. A further object is to decrease the construction cost and the operating cost of a propane dewaxing plant and obtain the advantage of increased efficiency, refrigeration, economy, etc., inherent in a continuous system. Other objects will be apparent as the detailed description of our invention proceeds.

In practicing our invention we utilize the hydrostatic head of a column of propane-waxy oil solution to prevent unduly rapid vaporization of propane. By gradually diminishing this hydrostatic head we effect a gradual release in pressure and a gradual vaporization of propane, which in turn effects a gradual chilling. Propane is trapped out at suitable points to avoid turbulence and undue agitation. By the time the solution reaches the top of the hydrostatic column (atmospheric pressure) it is at dewaxing temperature and may be readily filtered, settled or centrifuged.

The invention will be more clearly understood from the following detailed description and from the accompanying drawings which form a part of this specification, and in which Fig. 1 is a diagrammatic elevation of a simple form of our invention;

Our invention will be described in connection with the dewaxing of an overhead S. A. E. 50 Mid-Continent lubricating oil stock. It should be understood, however, that the invention is equally applicable to distillate stocks and residuums, to heavy stocks and light stocks and to paraffinic, naphthenic or mixed base crudes. It is well-known in the art that lighter oils such as paraffin distillate requires less propane and may be dewaxed at higher temperatures than bright oil stocks. Likewise, we may use other normally gaseous diluents in place of propane. These features and modifications will be apparent to those skilled in the art from the description of the following preferred embodiments.

Figure 1:
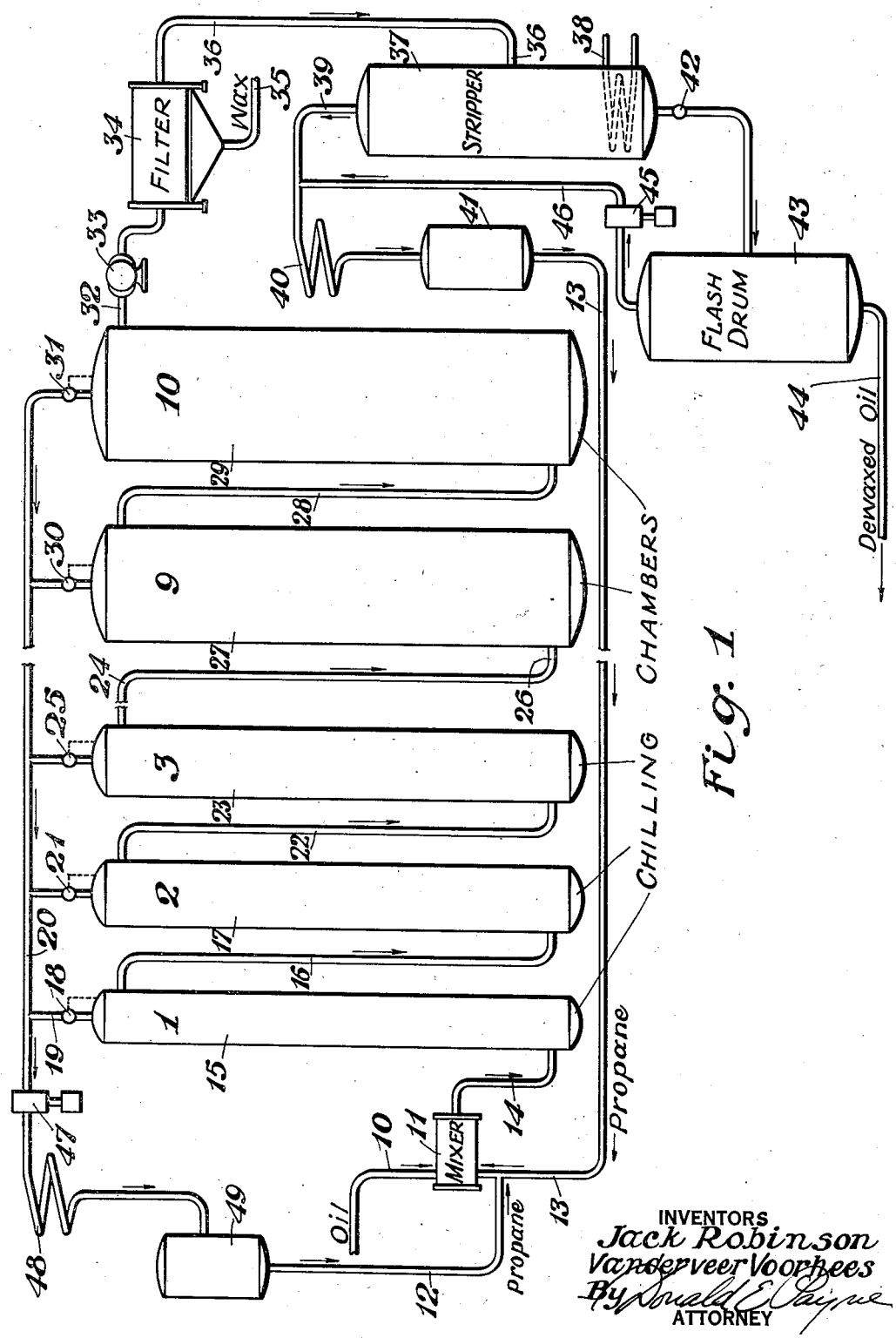

As already pointed out, our invention utilizes the hydrostatic head of the liquid to maintain pressures at high temperatures. The average density of propane will be about 33 to 34 pounds per cubic foot, assuming an initial temperature of 90° F. and a dewaxing temperature of —40° F. The total pressure drop will be about 150 pounds per square inch. This means that a hydrostatic head of 630 feet will be required if no appreciable amount of vapor is allowed to collect in the chiller. The effect of a single column 630 feet tall may be obtained by using ten towers about 63 to 65 feet high and maintaining a pressure drop across each tower of about 15 pounds per square inch. This method of practicing our invention is described in Fig. 1. It should be understood that the apparatus shown herein will be suitably heat insulated.

Oil stock from line 10 is introduced into mixer 11 and admixed with propane from lines 12 and/or 13. The temperature of the original mixture does not have to be as high as the temperature of the original mixture in batch chilling, and we have found that for certain stocks, at least, an initial temperature of ninety degrees is adequate. Higher initial temperatures may be employed and an extra chilling tower may be used if desired.

The mixture at about 150–160 pounds pressure is introduced through line 14 to the base of tower 15, which is about 1 foot 11 inches in diameter and about 65 feet high. The mixture will flow upwardly through the tower at a rate of about 1 to 1½ inches per second, our preferred plant being designed to handle 1,000 barrels (50 gallons) per day of waxy stock with an initial propane ratio of about 3½:1 to 4:1. The liquid overflows from the top of tower 15 through conduit 16 which leads to the base of No. 2 tower 17. Conduit 16 is of relatively large cross section so that it is not completely filled with liquid, the liquid level being maintained at the bottom of this conduit by the vapor pressure of the propane in the top of tower 15. This vapor pressure may be maintained at about 135 pounds per square inch by a pressure regulated release valve 18 in conduit 19 which leads to gas line 20.

The propane waxy oil mixture at the base of tower 17 will be at the same pressure as the vapor pressure in the top of No. 1 tower 15, namely, 135 pounds per square inch. Its corresponding temperature will be about 84° F. As this liquid gradually rises in No. 2 tower 17 and the hydrostatic head is decreased it is gradually cooled to a temperature of about 76° F., the vapor pressure in the top of No. 2 tower 17 being maintained at about 120 pounds per square inch by pressure regulated valve 21.

Propane slurry from the top of No. 2 tower 17 is introduced through line 22 to the base of No. 3 tower 23 at a pressure of 120 pounds per square inch, and it gradually rises therein and overflows through conduit 24 at a temperature of about 67° F. and a pressure of about 105 pounds per square inch, the pressure being maintained by pressure regulating valve 25.

Similarly, the solution is passed through a whole series of towers, the pressure being decreased about 15 pounds in each tower and the temperature being lowered from about 67° F. to about 58° F., then to 48° F., to 37° F., to 24° F., to 9° F., to —12° F., and finally at the top of the tenth tower to —40° F. Since the pressure is gradually decreasing from tower to tower it is necessary that the diameters of these towers gradually increase in order that the requisite amount of propane be released by vaporization. The diameters of the second to fourth towers will range from about 2 feet 3 inches to 2 feet 8 inches. The diameters of the fifth and sixth will be about 3 feet 1 inch and 3 feet 7 inches, and the diameters of the eighth, ninth and tenth will be about 4 feet 3 inches, 5 feet 9 inches and 8 feet 4 inches respectively. Increase in tower area is required because of the decreased vapor density at the lower pressures. These towers are designed to provide for a constant upflow of about 1 inch per second of vapors and liquids in the system. Towers of more uniform cross section may be used if propane trap-outs are used, as will be hereinafter described.

Referring again to Fig. 1, the slurry from tower No. 8 is introduced through conduit 26 to the base of No. 9 tower 27. Slurry from the top of this tower is transferred through line 28 to the base of No. 10 tower 29, the vapor pressure at the top of tower 27 being maintained constant by pressure regulated valve 30, and in the top of tower 29 by pressure regulator valve 31.

Cold slurry at about atmospheric pressure and —40° F. is withdrawn through line 32 and forced by pump 33 or by fluid or hydrostatic pressure to filter 34 which may be of the continuous rotary type. Wax is withdrawn from the filter through line 35 to suitable deoiling systems and/or to propane recovery stills.

Filtrate is withdrawn through line 36 through suitable heat exchangers (not shown) to stripper 37 heated by steam coil 38. High pressure propane vapors are passed through line 39 to condenser 40 and thence to storage tank 41. The oil passes from the base of stripper 37 through release valve 42 to flash drum 43 from which dewaxed oil is withdrawn through line 44, propane vapors being compressed by compressor 45 and passed by pipe 46 to condenser 40. Makeup propane from tank 41 is introduced through line 13 to mixer 11, as hereinabove described.

Figure 2:
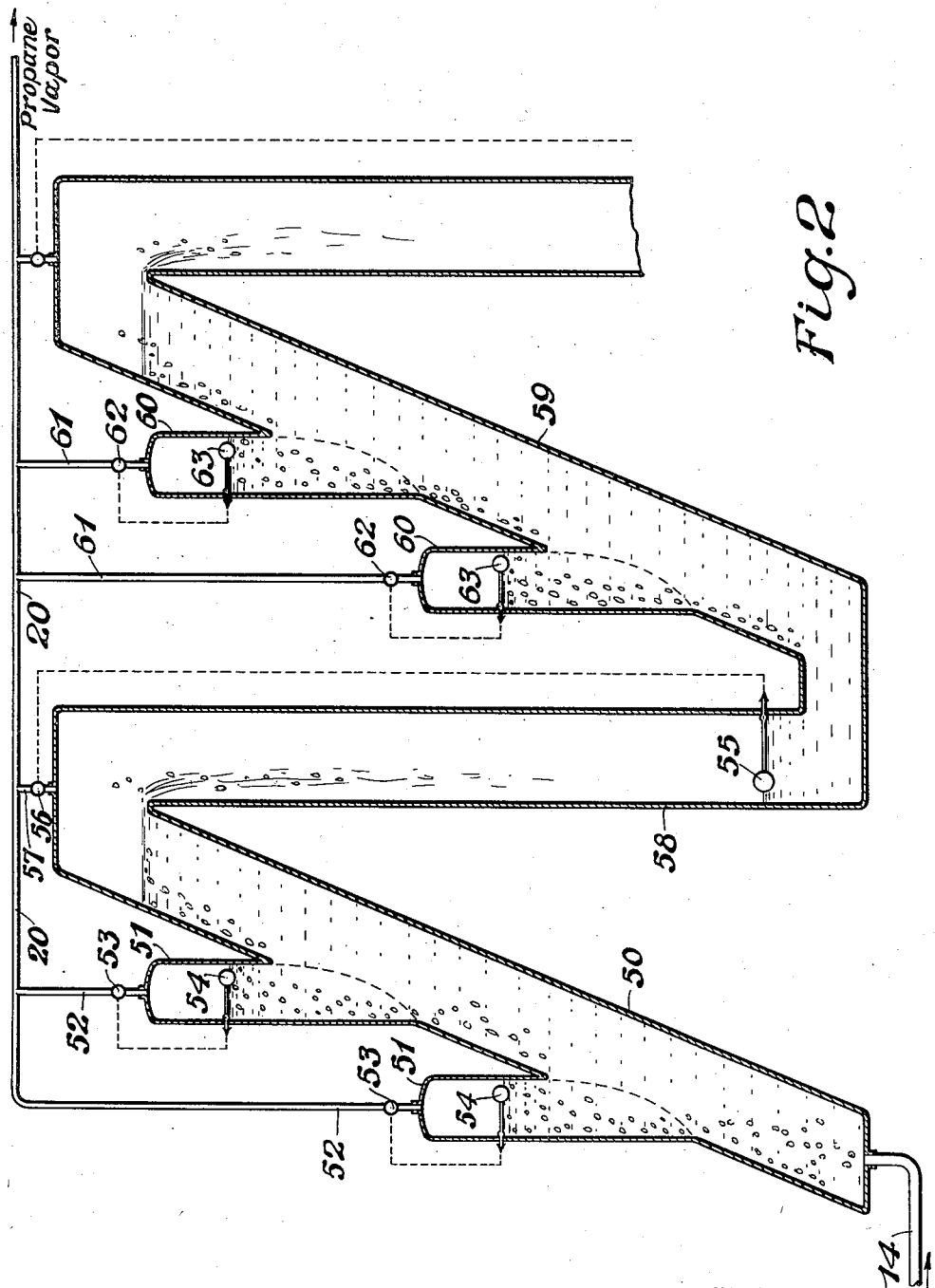
Fig. 2 is a diagrammatic vertical section through a modified type of chiller column.
Figure 3:
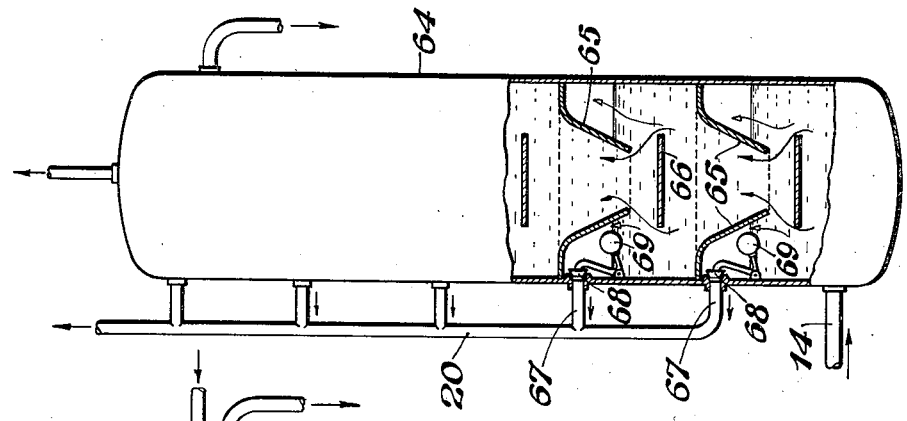
Fig. 3 is an elevation partly in section of still another type of chiller column.

Low pressure propane gas line 20 is connected to the intake side of compressor 47 which discharges into condenser 48, the condensed propane being collected in tank 49 for reuse. The propane recovery system and the filter mechanism are the same as those which have already been proposed for propane dewaxing systems and they will therefore not be described in further detail.

Where it is desired to employ initial towers of larger cross sectional areas we may provide for the removal of liberated propane vapors by employing modified coolers as described in Figs. 2 and 3. In Fig. 2 the slurry is discharged through line 14 and into the base of an inclined column 50 which is provided with a plurality of upwardly-extending gas traps 51. Propane is discharged from these traps to line 20 through conduits 52 which are provided with valves 53 controlled by liquid level devices 54 in the gas traps, thus the liberated propane may be removed so that it will not cause undue turbulence and so that it will not act as a gas lift to unduly decrease the pressure due to the hydrostatic head.

Another feature of the modified chiller of Fig. 2 is the use of liquid level control means 55 for controlling valve 56 in gas line 57 leading from the top of tower 50 to low-pressure gas line 20. If the liquid level in downcomer tower 58 gets too high valve 56 will close so that the propane pressure will force the liquid back to the desired level. On the other hand, if the propane pressure becomes great enough to unduly depress the liquid level in tower 58 valve 56 will be opened to release propane gas. It will thus be seen that this liquid level controlled valve 56 acts as a pressure-controlled valve but it differs from the valves in Fig. 1 because it is mainly influenced by pressure conditions in the following tower 59. Tower 59 is provided with trap-outs 60 and gas release pipes 61, the gas being vented through valves 62 which are in turn controlled by liquid level devices 63. The propane mixture is passed from tower to tower in this manner until it has been chilled to the required extent.

In Fig. 3 we have shown a vertical standpipe chiller 64 provided with trap-out baffles 65 and deflectors 66 for directing propane gas underneath the trap-out baffles. The propane gas is removed from the space underneath each trap-out baffle through pipes 67 in accordance with the position of valve 68 operated by liquid level controls 69. This modification of our invention is along the same general line as the modification disclosed in Fig. 2 in that it insures the maintenance of the hydrostatic head and it prevents undue turbulence. It should be understood that other types of baffles or propane trap-outs may be employed for this purpose.

Figure 4:
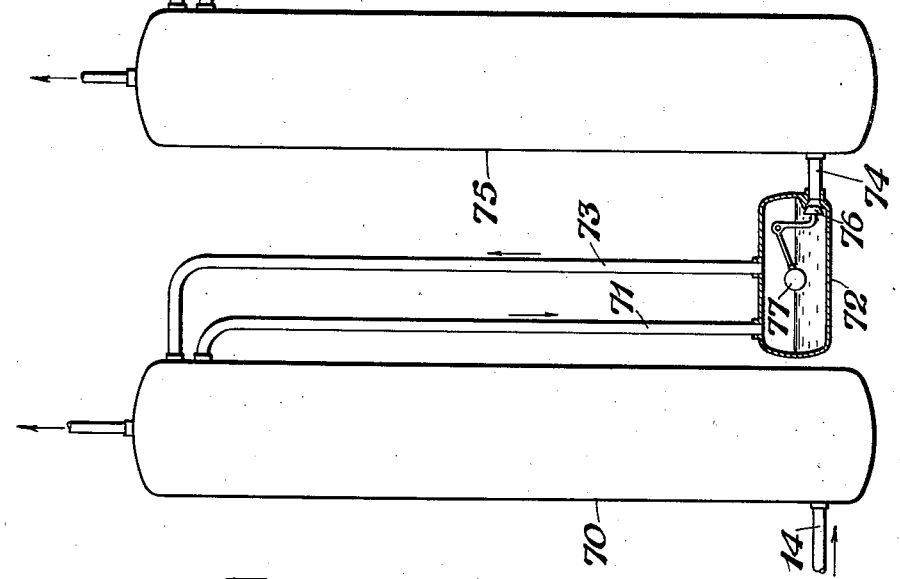
Fig. 4 is an elevation partly in section of a device for maintaining the top of one column at the pressure of the liquid in the base of the succeeding column.

It has already been pointed out that the vapor pressure at the top of one tower should be the same as the pressure of the liquid at the bottom of the succeeding tower. In order to prevent vapors from being sucked from the top of one tower into the base of the following tower we may employ a liquid level controlled valve as illustrated in Fig. 4. Standpipe chiller 70 is provided with a liquid overflow pipe 71 which in turn leads to trap 72. The top of this trap is connected by pipe 73 to the top of standpipe or tower 70. The lower part of trap 72 is connected by pipe 74 to the lower part of standpipe chiller 75. A valve 76 controlled by float 77 automatically closes pipe 74 before any vapors can be drawn into the base of tower 75. Similar or equivalent traps may be employed between the various contiguous towers all along the line.

Figure 5:
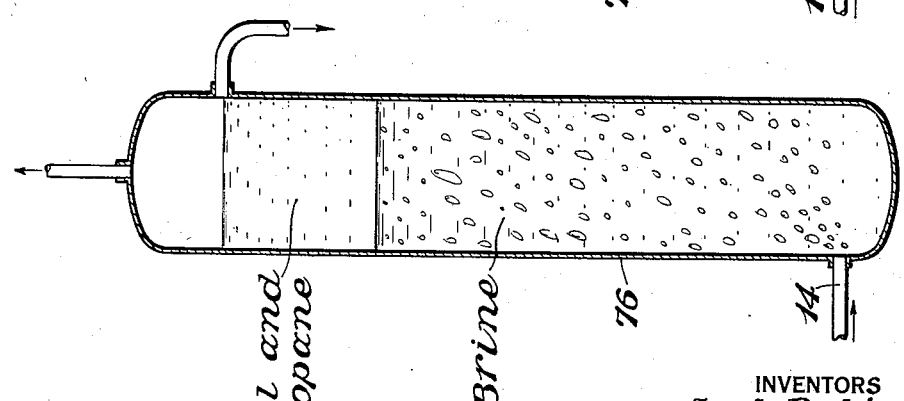
Fig. 5 is a vertical section of another modification of our invention wherein the hydrostatic head is increased by the use of a heavy liquid.

We may increase the hydrostatic pressure and thereby considerably lessen the necessary tower height by employing a heavy liquid such as brine in each chiller and by passing the propane waxy oil solution upwardly through this heavy liquid. Thus, as shown in Fig. 5, tower 76 may be filled almost to the top with brine or any other liquid which is not miscible with the propane waxy oil mixture. This mixture is gradually chilled as it passes upwardly through the brine and it overflows to a following tower in a manner disclosed in Fig. 1.

While we have disclosed in detail preferred embodiments of our invention, it should be understood that we do not limit ourselves to any of these details except as defined by the following claims, which should be construed as broadly as the prior art will permit.

We claim:

1. In apparatus of the class described, a series of towers of gradually increasing diameter, means for introducing liquid from the top of one tower to the base of the next succeeding tower, and means for maintaining a constant pressure in the top of each tower substantially equal to the pressure at the base of the next succeeding tower.

2. In apparatus of the class described, a plurality of towers of gradually increasing diameter, means for venting gases from the top of each tower, means for introducing liquid from the top of one tower to the base of the next succeeding tower and means for preventing vapors from the top of said first tower from entering the base of said succeeding tower.

3. The apparatus of claim 2 wherein the last means comprises a gas-liquid trap near the base of said succeeding tower, a liquid-level controlled valve regulating the discharge of liquid from the base of said trap to the base of said succeeding tower and a vent from the top of the first tower.

4. A propane dewaxing system which comprises means for mixing a waxy oil with propane at a relatively high temperature and pressure, a plurality of hydrostatic standpipe chillers of gradually increasing diameter, means for introducing the propane waxy oil mixture into the base of one chiller, from the top of said chiller into the base of the next succeeding chiller and so forth throughout the plurality of towers, a low pressure gas main, means for withdrawing propane from the top of each tower to said low-pressure gas main, means for maintaining the pressure in the top of each tower substantially the same as pressure in the base of the following succeeding tower, means for separating wax and wax-free diluted oil from the mixture leaving the top of the last chilling tower, and means for removing propane from the wax free oil.

5. The method of continuously chilling a mixture of wax-bearing oil with a normally gaseous diluent to form a slurry of readily separable wax, which comprises introducing said mixture at the base of a tower which is substantially filled with liquid, whereby there is a gradual decrease in hydrostatic pressure at increasing levels in said tower, increasing the hydrostatic pressure in said tower by maintaining an inert immiscible heavy liquid therein, slowly passing the mixture of diluent and wax-bearing oil upwardly in said tower through said heavy immiscible liquid to gradually lower the hydrostatic pressure of the mixture and to permit the gradual vaporization of diluent therefrom, withdrawing liberated gaseous diluent and continuously decreasing pressure on said mixture until dewaxing temperature is reached.

6. In an apparatus of the class described, a plurality of standpipe chillers connected in series, means for maintaining a constant pressure in the top of each chiller substantially equal to the pressure of the base of the next succeeding chiller, means for introducing liquid at the base of each chiller and for transferring liquid from the top of one chiller to the base of the next succeeding chiller, each of said chillers being slightly inclined from the vertical so that gases from the ascending liquids will collect on the upper side of the inclined chillers in order that they may be removed without causing turbulence and gas lift effects.

7. The apparatus of claim 6 which includes a plurality of vertical gas traps mounted on the upper side of said inclined towers at spaced intervals for removing gas from the ascending liquids in the chillers.

JACK ROBINSON.
VANDERVEER VOORHEES.